United States Patent [19]

Sealock, Jr. et al.

[11] Patent Number: 5,019,135
[45] Date of Patent: May 28, 1991

[54] METHOD FOR THE CATALYTIC CONVERSION OF LIGNOCELLULOSIC MATERIALS

[75] Inventors: L. John Sealock, Jr.; Douglas C. Elliott, both of Richland, Wash.

[73] Assignee: Battelle Memorial Institute, Richland, Wash.

[21] Appl. No.: 194,804

[22] Filed: May 17, 1988

Related U.S. Application Data

[63] Continuation-in-part of Ser. No. 107,175, Oct. 13, 1987, abandoned, which is a continuation of Ser. No. 773,338, Sep. 6, 1985, abandoned, which is a continuation of Ser. No. 380,027, May 20, 1982, abandoned.

[51] Int. Cl.$^5$ .............................................. C10J 3/00
[52] U.S. Cl. ...................................... 48/197 R; 48/209
[58] Field of Search ...................... 48/202, 197 R, 209; 585/733

[56] References Cited

U.S. PATENT DOCUMENTS

| | | |
|---|---|---|
| 3,505,204 | 4/1970 | Hoffman . |
| 4,113,446 | 9/1978 | Modell et al. ........................ 48/202 |
| 4,500,323 | 2/1985 | Siegfried et al. ..................... 48/202 |

FOREIGN PATENT DOCUMENTS

| | | |
|---|---|---|
| 1074117 | 8/1980 | Canada . |
| 2530600 | 1/1977 | Fed. Rep. of Germany ........ 48/202 |

OTHER PUBLICATIONS

Chemical Abstracts, vol. 43, Cols. 1944 & 1945 (no date).
Modell, "Gasification and Liquefaction of Forest Products in Supercritical Water," Paper Presented at the 89th National Meeting of the American Institute of Chemical Engineers, Aug. 20, 1980.
Mudge et al., "Catalyzed Steam Gasification of Biomass," *J. Analy. & Appl. Pyrol.*, 1:165–175 (1979).
Ross et al, "The Conversion of Cellulose to Fuel Gases Promoted by Selected Solid Additives," *Conversion & Recycling*, 4:15–18 (1981).
Weber et al., "Gasification of Biomass in the Presence of Multiple Catalysts for the Direct Production of Specific Products," Paper presented at Energy from Biomass & Wastes IV of Institute of Gas Technology, Jan. 21–25, 1980.
Willson et al., "Alkali Carbonate and Nickel Catalyses of Coal Steam Gasification", *Coal Gasification*, ed. Massey, Advances in Chem. Series No. 131, ACS, 1974, pp. 203–211.
Yoneda et al., *J. Soc. Chem. Ind. Japan*, 44:385–387 (1941).
Yoneda et al., *J. Soc. Chem. Ind. Japan*, 44:388 (1941).
Yoneda et al., *J. Soc. Chem. Ind. Japan*, 45:667–669 (1942).
Yoneda et al., "Water–Gas Conversion Under Elevated Pressure III, The Behavior of Water Gas in Aqueous Potassium Carbonate Solution Under Elevated Temperature and Pressure", *J. Soc. Chem. Ind. Japan*, 46:554–556 (1943).
Yoneda et al., *J. Soc. Chem. Ind. Japan*, 47:5–7 (1944).
Yoneda et al., *J. Soc. Chem. Ind. Japan*, 47:7–8 (1944).
Yoneda et al. "Water–Gas Conversion Under Elevated Pressure III, The Behavior of Water Gas in Aqueous Potassium Carbonate Solution Under Elevated Temperature and Pressure" (abstract), *Chem. Abs.*, 43:1944i (1949).

*Primary Examiner*—Peter Kratz
*Attorney, Agent, or Firm*—Wells, St. John & Roberts

[57] ABSTRACT

A method is disclosed for converting lignocellulosic materials contained in biomass and other feedstocks into a fuel gas. The method comprises maintaining, in a pressure vessel, at a temperature of 300° C. to 450° C. and a pressure of at least 100 atmospheres, lignocellulosic material and water, and amounts of alkali and reduced nickel catalysts sufficient to catalyze a reaction of the lignocellulosic material to produce a product gas composed primarily of methane, hydrogen and carbon dioxide.

18 Claims, 3 Drawing Sheets

METHOD FOR THE CATALYTIC CONVERSION OF LIGNOCELLULOSIC MATERIALS

This is a continuation-in-part of application Ser. No. 107,175, filed Oct. 13, 1987, now abandoned, which is a continuation of application Ser. No. 773,338, filed Sept. 6, 1985, now abandoned, which is a continuation of application Ser. No. 380,027 filed May 20, 1982, now abandoned. Each of these listed applications is incorporated herein by reference.

FIELD OF THE INVENTION

The present invention relates to methods for the conversion of lignocellulosic materials and in particular, the conversion of lignocellulosic materials into a usable fuel gas comprised primarily of methane, hydrogen and carbon dioxide.

BACKGROUND OF THE INVENTION

Thermochemical gasification of lignocellulosic materials (biomass feedstocks) has conventionally been limited to relatively "dry" feedstocks (i.e., under 50% moisture by weight). One reason for this constraint is the high latent heat of vaporization of water, which places limitations on gasification temperatures in high-temperature, short-residence time gasifiers. Direct combustion routes to recovering stored solar energy from biomass are similarly constrained, since the moisture content directly affects the net heating value of the biomass fuel.

Because of this practical limitation on moisture content, the range of feedstocks used for thermochemical processing has been narrow. Wood has been the primary feedstock, although various crop residues and by-products have been tried. While field drying is feasible in some instances, often these materials must be force-dried to some extent, which has the effect of reducing the net energy produced by the system.

Many otherwise promising biomass feedstocks have prohibitively high moisture contents. These include aquatic plants having moisture contents in excess of 90%, and many crop residues and tropical grasses having moisture contents as high as 75-85%. Some of these feedstocks are quite attractive as potential energy crops because they exhibit high growth rates, are relatively easy to harvest, or perform some beneficial ancillary function. For example, water hyacinths can be used to reduce the organic and heavy metal content of sewage water streams.

The high growth rate and availability of some of these high-moisture feedstocks make them potentially valuable additions to the resource base, provided that an efficient system for recovering their stored energy can be developed. The Department of Energy, recognizing the potential of these feedstocks, supports a program devoted to the development and study of herbaceous crops for production of biomass energy. The Department of Agriculture is also studying a number of plants which can be grown on marginal soils to produce chemicals and energy. Many of these materials are simply too wet to be used as a feedstock in conventional high-temperature thermochemical gasification systems. In addition, the ash contents of some high moisture feedstocks is quite significant and could pose problems in a high-temperature gasification system.

In addition to cultivated feedstock sources, a wide variety of food processing waste streams contain lignocellulosic materials which could be converted into fuel gas. Solid and liquid wastes, such as brewer's spent grain, tomato cannery wastes, potato peeling and processing wastes and grape pomace, are potential feedstocks if the high moisture content can be overcome.

Some of the feedstocks mentioned above have also been studied for possible biological conversion of the biomass to methane, such as by anaerobic digestion, which is an inherently high-moisture operation. Biogasification has some serious limitations, however. Compared to thermochemical gasification, the rate of conversion is orders of magnitude slower. The most direct process implication of this lower rate is the relatively large reactor volumes required to produce a given quantity of gas. The ultimate degree of conversion which can be obtained in biological systems is also limited, particularly in materials with high lignin contents. Finally, biological gasification systems are more susceptible to process upsets due to control system failure or the inadvertent introduction of poisons to the reactor.

Modell et al. U.S. Pat. No. 4,113,446 shows a gasification process for converting liquid or solid organic material to gas. The patent, while claiming that catalysts are not required in the conversion, lists suitable catalysts as including nickel, molybdenum, cobalt, their oxides and sulfides, and noble metal catalysts such as platinum, palladium or the like or mixtures thereof either unsupported or supported on a base such as silica, alumina mixtures thereof or the like. Although Modell et al. mention that any organic solid material, including garbage, paper, sawdust, etc. can be converted using process parameters similar to those in the present application, the test results shown in the patent and elsewhere in the open literature show that a suitable catalyst was never identified for these feedstocks. There is no indication that Modell et al. ever experimented with combining catalysts to increase the conversion rate. In addition, there is no indication that Modell et al. appreciated the effects of alkali as a catalyst for the reaction or understood the importance of reduced nickel metal as opposed to the metal oxides and noble metals claimed as catalysts in the patent. Since Modell et al observed no catalytic activity in their system, this fact led them to believe that the conversation could be performed in the presence or absence of a catalyst.

SUMMARY OF THE INVENTION

A method has now been discovered to convert lignocellulosic materials into a fuel gas containing primarily methane, carbon dioxide and hydrogen, at lower temperatures than conventional thermochemical processes. By utilizing a combination of relatively high pressure, an alkali/reduced nickel co-catalyst system and moderate temperatures (300° C. to 450° C.) without the addition of air or oxygen, a very high methane content is achieved in the product gas.

The low-temperature reactor system can utilize a wide variety of high-moisture feedstocks, while at the same time achieving low residence times and high overall conversion of the lignocellulosic materials. The system has be operated with slurries containing up to 95% moisture, which allows it to utilize an extremely broad range of feedstocks without prior dewatering or drying.

The system of the present invention facilitates the gasification of a full range of biomass feedstocks, even at moisture contents exceeding 95%. It is capable of producing a methane-rich product gas with a raw methane content of 30% to 50% +, and with methane yields comparable to those obtained via bioconversion. Methane yields in excess of 6 scf of methane per pound of dry ash-free biomass have been obtained. Use of the present method can expand the biomass resource base to include a variety of high-growth rate materials, as well as increase the number of processing options available to potential users of biomass fuels.

According to this disclosure, lignocellulosic materials are converted to a fuel gas rich in methane in the presence of water, an alkali catalyst and reduced nickel metal catalyst in a high-pressure reactor with pressures above 100 atmospheres at a temperature of 300° C. to 450° C. Methane production is greatly increased due to the lower temperatures and higher pressures of the system.

DETAILED DESCRIPTION OF PREFERRED EMBODIMENTS

In accordance with the present invention, a pressurized aqueous reactor system is used for the conversion of lignocellulosic materials into a fuel gas comprised primarily of methane, hydrogen and carbon dioxide.

For the purposes of this disclosure, the term "lignocellulosic material" is defined as any plant tissue containing lignin and at least 1 wt % cellulose and any aqueous solution, suspension, slurry or sludge containing such plant tissue. Such plant tissue includes the tissue of woody and nonwoody plants and partially digested or reacted plant tissue of the type found in manure or peat and would include commercial grade cellulose, which typically contains 1-2 wt % lignin. Highly fossilized tissue, such as coal, is not considered to be lignocellulosic material for the purpose of this application. Typical lignocellulosic feedstocks include food processing wastes and other similar solid and liquid waste sources.

The present invention is a method for converting lignocellulosic materials into a fuel gas. This is accomplished by reacting the lignocellulosic materials in a pressure vessel. The inlet stream of lignocellulosic materials will typically comprise 2-30 wt % solids (1-15 wt % carbon) and potentially some dissolved organics in an aqueous solution or slurry. The amount of water present must be sufficient to provide hydrogen as need to promote the formation of product gases.

Inside the pressure vessel, the lignocellulosic materials are maintained without the addition of air or oxygen at a temperature of 300° C. to 450° C. and a pressure of at least 100 atmospheres, with additional water (if necessary) and amounts of both an alkali and reduced nickel metal sufficient to catalyze a reaction of the lignocellulosic materials to produce a fuel gas composed primarily of methane, hydrogen and carbon dioxide. Although some feedstocks contain oxygen, no additional oxygen, (which can oxidize the reduced nickel catalyst) is introduced into the reactor. Preferably, pressure is just high enough to prevent water in the reactor from boiling over. The best results are achieved, with most feedstocks, at about 400° C.

The method can further include the steps of pretreating the feedstock to homogenize the lignocellulosic materials. This step is recommended when dealing with lignocellulosic materials contained in large pieces, such as plant stems and leaves. Preferably, the size of the lignocellulosic materials is decreased to an average size no greater than about 1.0 centimeters, using suitable equipment such as shredders, grinders, etc.

The present invention can also include the step of preheating the lignocellulosic materials. In particular, the process can be designed so that waste heat can be recovered and used to provide the heat required to preheat the lignocellulosic materials before delivery to the pressure reactor. This pre-heat serves to partially liquefy the feedstock and make slurries that are more suitable for pumping into the reactor. In addition, the feedstock may be pressurized before delivery to the pressure reactor.

Experimental System

In order to study the kinetics of the process of the present invention, an experimental reactor system was developed. In the experimental system, a lignocellulosic slurry was converted at low temperatures (300° C. to 450° C.) and pressures up to 355 atmospheres to a fuel gas consisting primarily of methane, hydrogen and carbon dioxide. The experimental system was equipped with a sampling system which allowed several samples to be taken throughout the course of the experiment while the reactor was maintained at reaction temperature and pressure.

Figure 1:
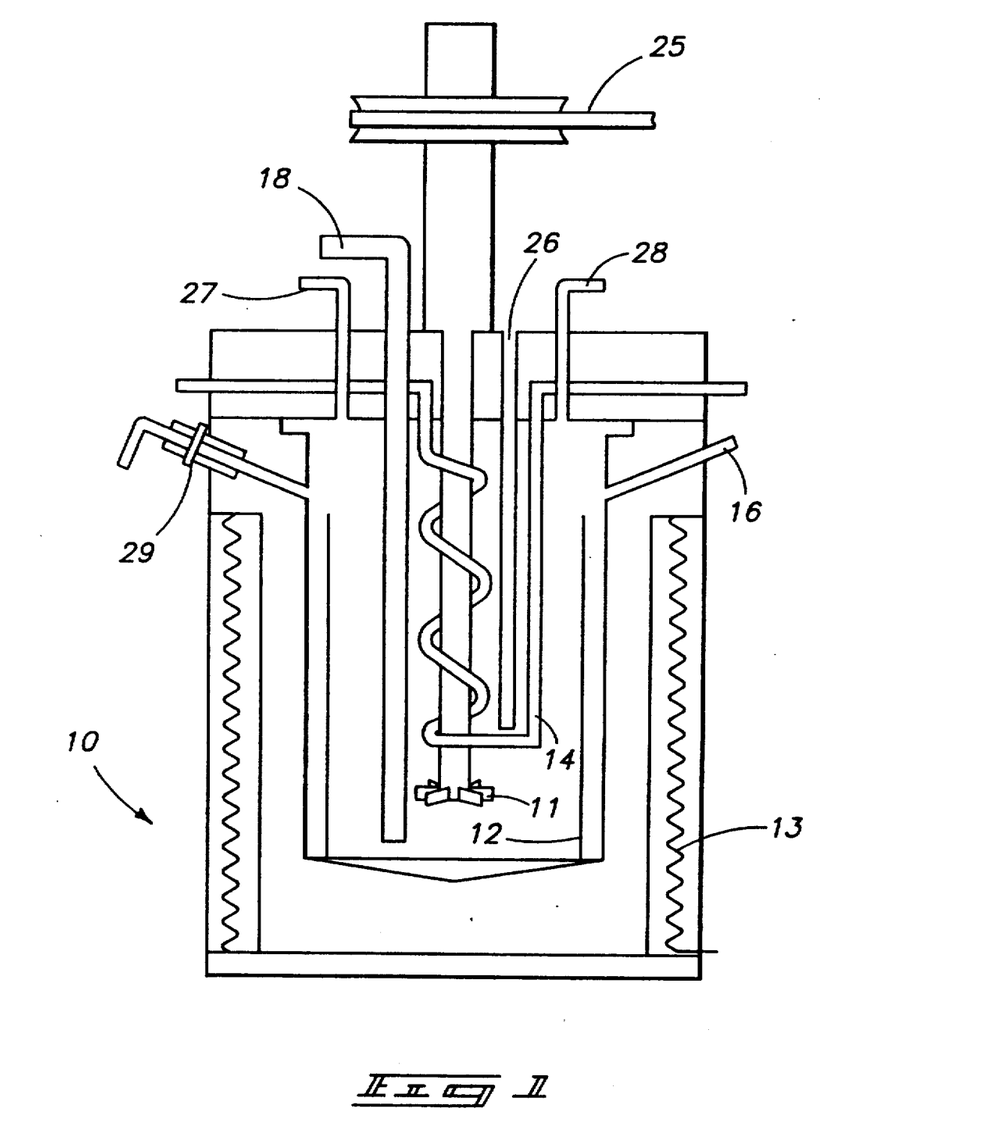
FIG. 1 is a schematic cross-sectional view of the autoclave apparatus used for testing the method of the present invention.

The experimental reaction system is shown in FIG. 1. The pressure vessel was a one-liter Inconel autoclave 10 equipped with a magnetic stirrer 11 driven by a belt 25. The autoclave 10 was of conventional design and was operated with standard electrical heating, cooling and stirring equipment provided with the unit. A stainless steel liner 12 was fitted into the reactor to facilitate product recovery and reactor cleanup. A thermocouple 26 was received inside liner 12 for monitoring temperature. Pressure within the reaction environment was monitored at 27. Outlet 28 was provided for off gas venting. Valve 29 was provided for over-pressure safety relief.

The autoclave 10 was heated with an electric heater 13 having the capability to heat the reaction environment to approximately 500° C. Typical heat-up time required to heat 300 ml of lignocellulosic slurry and catalyst to 400° C. was about 90 minutes. The lignocellulosic slurry and catalyst were rapidly mixed inside the autoclave by the magnetic stirrer 11. The system was provided with a cooling coil 14 that was used to cool down the reactor contents at the end of each experiment.

Gas samples were taken from the autoclave 10 through a body wall port 16 in the top of the reactor. The autoclave 10 and sample removal system (not shown) were operated remotely after the reactor was batch charged. The sampling system allowed the entire sample loop to be evacuated prior to taking a sample, thus avoiding contamination from previous samples.

During the experiments, the contents of the autoclave 10 were sampled at regular intervals using the remote sampling system. This system consisted of a 100 ml sample vessel which was connected to an air-operated valve which could be opened by turning an air valve on the outside of the safety barrier. Opening the valve allowed the sample vessel to be filled with a sample of the reactor contents. Provisions were made to allow samples to be taken from either the top or the bottom of the reactor, through either gas sample port 16 or liquid sample port 18.

A typical sample contained approximately 0.6 to 1.0 standard liters of off-gas and a small quantity of water or other liquid material. The volume of the liquid and gas were measured, and a portion of the gas was analyzed using a gas chromatograph (not shown). The chromatograph was set up to detect and quantify the following gases: oxygen, nitrogen, carbon dioxide, carbon monoxide, hydrogen, methane, ethane and ethylene. These gases typically constituted 95-99% of the total gas composition, with the remainder consisting largely of higher hydrocarbons.

In a typical catalytic experiment, the desired amount of lignocellulosic materials, alkali catalyst (if required), reduced nickel metal catalyst and any needed water were weighed, mixed and charged to the stainless steel liner 12 under ambient conditions. The autoclave 10 was sealed, purged with nitrogen to remove any oxygen, tested for leaks at 70 atm with nitrogen and vented until the pressure in the reactor was 8 atm. The nitrogen that remained in the reactor was used as a reference to monitor the accumulation of gaseous products produced during the conversion of the lignocellulosic materials to gas. This was accomplished by measuring the dilution of the nitrogen in the gas samples taken at regular intervals once the reactor reached the desired reaction temperature. The reactor was then held at this temperature for approximately one hour. Pressures in the system ranged from about 165 to 340 atm, depending on the reaction temperature selected and the amount of gas produced.

At the end of each experiment, cooling water was flushed through the internal cooling coil 14 of the reactor and the contents were brought to a temperature of 200° C. within about 5 minutes. After the autoclave 10 had cooled completely, the gas product was vented and analyzed by conventional methods using suitable equipment, such as a gas chromatograph. The liquid contents of the reactor were removed, measured and saved for later analysis by conventional methods, including gas chromatography. Solids, which included catalyst and residue from the lignocellulosic materials, were filtered from the liquids, dried, weighed and the carbon content thereof determined.

Selection of Biomass Feedstock

Tests were completed on lignocellulosic materials in a variety of feedstocks. Elimination of the usual constraint of low moisture content allowed a wide variety of feedstocks to be considered. The selection of these feedstocks was based on the availability, chemical composition and estimated potential for large-scale use.

A number of high-moisture feedstocks were selected for in-depth study. The selection of these feedstocks provided a broad range of feedstock properties so that the concept could be adequately evaluated. Characterization of the feedstocks consisted of a structured analytical program designed to determine moisture content, ash content, heating value and gross elemental composition (carbon, hydrogen, nitrogen and oxygen). The feedstocks were further studied to determine their ability to be made into a slurry.

TABLE I summarizes the composition of the various feedstocks. Evaluation of the feedstock characterization data points out the extreme variability of the feedstocks, especially with regard to ash content and nitrogen content.

TABLE I

Analysis of High-Moisture Biomass Feedstocks

| Feedstock | \multicolumn{5}{c}{mass percent, dry basis} | percent Moisture | Btu/lb HHV**, dry |
|---|---|---|---|---|---|---|---|
|  | C | H | N | O | Ash |  |  |
| napier grass | 45.2 | 6.0 | <0.1 | 42.3 | 5.7 | 84.4 | 7870 |
| sorghum | 44.4 | 5.8 | 0.4 | 38.3 | 7.9 | 77.0 | 8040 |
| sunflower I | 40.2 | 5.3 | 0.7 | 38.6 | 11.7 | 83.0 | 7420 |
| sunflower II | 40.6 | 5.3 | 1.0 | 39.2 | 9.8 | 82.2 | 7630 |
| corn stover | 43.0 | 5.5 | 1.2 | 37.8 | 10.8 | 41.2 | 7450 |
| water hyacinth | 43.0 | 5.8 | 5.6 | 29.5 | 15.3 | 94.9 | 7730 |
| kelp | 26.9 | 4.0 | 1.2 | 30.2 | 38.4 | 89.0 | 7150 |
| potato waste | 44.7 | 6.6 | <0.1 | 44.5 | 3.7 | 88.0 | 7870 |
| spent grain | 48.6 | 6.8 | 3.4 | 35.3 | 3.4 | 80.5 | 9170 |
| grape pomace | 52.5 | 6.0 | 1.8 | 33.7 | 5.4 | 52.5 | — |
| anaerobic digestion sludge | 44.3 | 6.0 | 3.1 | 28.8 | 18.1 | 96.5 | 8400 |
| digestion sludge II* | 3.1 | 11.7 | 0.5 | — | — | 92.8 | — |
| black liquor* | 18.7 | 7.3 | <0.1 | 52.6 | — | — | — |
| cellulose* | 42.4 | 6.1 | <0.1 | 47.3 | — | — | — |
| wood flour | 52.0 | 6.3 | <0.1 | 40.5 | 0.1 | 2.0 | 8190 |
| peat | 58.0 | 4.7 | 0.5 | 31.0 | 4.6 | 32.9 | — |
| lignite | 56.6 | 3.8 | 0.1 | 25.8 | 9.0 | 12.0 | — |

*Not dried, characterization on an as-received basis.
**HHV is Higher-Heating Value.

In order to establish baseline data, each of the feedstocks was processed as a 10 wt % solids content slurry, except where in raw biomass had an intrinsic solids content lower than 10%. This was the case with only two feedstocks, namely water hyacinths and anaerobic digestion residue.

Effect of Catalysts

Table II is a listing of the quantities of gas produced during conversion of lignocellulosic and other materials in a pressurized, aqueous environment. The results as presented are generally for a one-hour experiment with a ratio of solids to water of 1:10. Gaseous samples were removed from the reactor every fifteen minutes during the experiment. Analyses of these samples yielded the data in Table II, which is based on the calculated final mass of gas. Note also that the autoclave feedstock loading was less at 450° C. than at 350° and 400° C. This reduction in loading was due to the pressure limitations of the equipment. Ratios of reactant masses were held constant in all experiments.

The data in Table II has led to many conclusions regarding the conversion of lignocellulosic materials by the present invention. For the example of woodflour in Table II, the best results were obtained when using a catalyst which was a mixture of sodium carbonate and the reduced nickel catalyst. The results obtained using the sodium carbonate and reduced nickel catalyst were better than with either the reduced nickel or the sodium carbonate alone.

The primary gas product from the conversion of the Douglas Fir woodflour was carbon dioxide. Methane, carbon monoxide and hydrogen gas are lesser products produced in nearly equimolar concentration. Increasing temperature decreases the carbon monoxide and carbon dioxide production while hydrogen gas and methane increase slightly. In the uncatalyzed case, the total production of $C_2$ hydrocarbons does not change much with increase in temperature; however, the mole ratio increases to 10:1 from 1:1 for $C_2$ to C=C. Addition of sodium carbonate causes a decrease in methane and carbon monoxide yields. The addition of reduced nickel catalyst causes a great increase in methane production. The addition of sodium carbonate to the nickel catalyst actually reduces the methane production (compared to nickel alone) except at the low temperature end of the study. With Douglas Fir woodflour as feedstock, reduced nickel appears to increase both hydrogen gas and carbon dioxide production.

The cobalt catalyst was Harshaw Co-0127 (39% reduced cobalt on Keiselguhr support). Although the catalyst supports and metal percentages are not identical, these two catalysts were used since they are reasonably comparable commercially available catalysts from the same manufacturer. Equal weights of the supported catalysts were used.

A slurry of 10% cellulose in water was placed in the reaction vessel with the catalyst materials, and the reaction conducted at 350° C. for 45 minutes (i.e., experiments were conducted well below the critical temperature of water). The results are summarized in Table III:

TABLE III

| Catalyst | Percent of Carbon Converted To Gas | g of $CH_4$ per 100 g of Cellulose Slurry |
|---|---|---|
| None | 19 | 0.4 |
| Ni/Na$_2$CO$_3$ | 72 | 8.6 |
| Co/Na$_2$CO$_3$ | 76 | 1.7 |

TABLE II

Final Product Gas Composition Calculated In Grams.

| | | 350° C. | | | | 400° C. | |
|---|---|---|---|---|---|---|---|
| Feedstock | Catalyst[2] | $CH_4$ | CO | C=C/$C_2$ | $H_2$/$CO_2$ | $CH_4$ | CO |
| Cellulose | O | .062[1] | .406 | .048[3] | .010/4.992 | .187[1] | .742 |
| | Na | .013 | .061 | .014/.009 | .264/10.203 | .076[1] | .053 |
| | Ni | .577 | .427 | .016/.064 | .069/7.940 | 1.515[1] | .256 |
| | Na/Ni | 1.792 | .048 | .029/.284 | .671/18.27 | 3.74 | .036 |
| Holocellulose | Na/Ni | 1.263 | .054 | .001/.120 | .417/14.90 | 3.598 | .047 |
| Lignin | O | .219 | .171 | .010/.030 | .010/2.639 | 1.202 | .324 |
| | Na | .148 | .002 | .005/.012 | .091/4.776 | .392 | .000 |
| | Ni | .438 | .109 | .010/.034 | .081/4.223 | 1.097 | .100 |
| | Na/Ni | .251 | .005 | .005/.022 | .131/5.869 | .468 | .000 |
| Woodflour | O | .318 | .506 | .034/.042 | .034/6.333 | .455 | .154 |
| | Na | .138 | .069 | .018/.028 | .321/10.96 | .433 | .034 |
| | Ni | .704 | .389 | .018/.061 | .155/8.628 | 4.101 | .197 |
| | Na/Ni | 1.037 | .039 | .004/.095 | .450/13.86 | 3.753 | .025 |

| | | 400° C. | | 450° C. | | | |
|---|---|---|---|---|---|---|---|
| Feedstock | Catalyst[2] | C=C/$C_2$ | $H_2$/$CO_2$ | $CH_4$ | CO | C=C/$C_2$ | $H_2$/$CO_2$ |
| Cellulose | O | .170[3] | .021/5.541 | .506[1] | .405 | .036/.209 | .107/6.932 |
| | Na | .081[3] | .215/8.386 | .866[1] | .072 | .088/.462 | .377/12.84 |
| | Ni | .238[3] | .394/12.73 | 1.429[1] | .205 | .004/.150 | .295/10.47 |
| | Na/Ni | .000/.407 | .602/20.13 | 2.940[1] | .087 | .006/.325 | .508/15.44 |
| Holocellulose | Na/Ni | .008/.402 | .653/21.73 | 3.703 | .042 | .009/.507 | .495/22.537 |
| Lignin | O | .017/.156 | .044/5.962 | 1.975[1] | .102 | .021/.379 | .246/11.12 |
| | Na | .009/.095 | .211/7.071 | 1.175[1] | .018 | .018/.330 | .281/8.095 |
| | Ni | .013/.139 | .115/7.457 | .668[1] | .094 | .006/.101 | .109/3.387 |
| | Na/Ni | .006/.091 | .184/6.378 | 1.559[1] | .029 | .018/.343 | .357/11.07 |
| Woodflour | O | .026/.114 | .070/7.875 | .428[1] | .231 | .014/.137 | .057/3.953 |
| | Na | .050/.225 | .440/14.00 | .870[1] | .042 | .068/.409 | .252/9.714 |
| | Ni | .010/.310 | .582/18.54 | 4.169[1] | .046 | .002/.146 | .403/14.70 |
| | Na/Ni | .001/.449 | .446/23.36 | 3.65[1] | .038 | .003/.330 | .534/16.98 |

[1]Experiments performed with 20 grams of feedstock charge, all others used 30 grams of feedstock
[2]O = no catalyst added, Na = 10.2 grams sodium carbonate added, Ni = five grams of supported nickel metal catalyst added
[3]Total $C_2$-hydrocarbons reported as ethane.

Additional tests were run to compare the conversion of the lignocellulosic materials with a variety of catalyst combinations. In particular, tests were run where cobalt was used in place of the reduced nickel, where potassium carbonate was used as the alkali carbonate, and where cesium carbonate was used as the alkali carbonate.

Nickel-Cobalt Comparison

In this example, a reduced nickel/Na$_2$CO$_3$ catalyst combination, as described in the specification, was compared to a Co/Na$_2$CO$_3$ catalyst combination. The respective catalysts were both made by Harshaw Chemical Company; both are marketed by that firm for the same purpose, hydrogenation (but have more than one application). The reduced nickel catalyst was Harshaw Ni-1404 (68% reduced nickel on proprietary support).

Carbonate Comparison

Similar experiments were conducted to compare the activity of different carbonates when used with the reduced nickel metal catalyst material. It was found that cesium and potassium carbonate work even better than sodium carbonate for catalyzing gasification. The tests were conducted using 10% cellulose slurry reacted for 15 minutes at 400° C. The results are summarized in Table IV:

TABLE IV

| Catalyst | Percent of Carbon Converted To Gas | g of CH$_4$ per 100 g of Cellulose Slurry |
| --- | --- | --- |
| Ni/Na$_2$CO$_3$ | 68 | 11.5 |
| Ni/K$_2$CO$_3$ | 72 | 12.3 |
| Ni/Cs$_2$CO$_3$ | 79 | 15.3 |

From the foregoing experiments, it appears that the entire range of claimed catalysts will have unexpectedly great ability to gasify lignocellulosic materials as was observed with the Ni/Na$_2$CO$_3$ catalyst considered previously. The cobalt catalyst produced somewhat less methane than the nickel catalyst, but overall gasification was greater.

Catalyst Concentration

A number of tests were run on the various biomass feedstocks. For the majority of runs, the temperature was varied between 400° and 450° C. A sodium carbonate/supported reduced nickel catalyst combination was used, with the following catalyst concentrations: alkali 0.0 and 0.34 g/g lignocellulosic material; and reduced nickel 0.0 and 0.16 g/g lignocellulosic material. The reduced nickel catalyst used in these tests was Ni-1404 sold by Harshaw Chemical Company. The pressures involved were the autogenic system pressure, which ranged from 272 atm to 354 atm.

Figure 2:
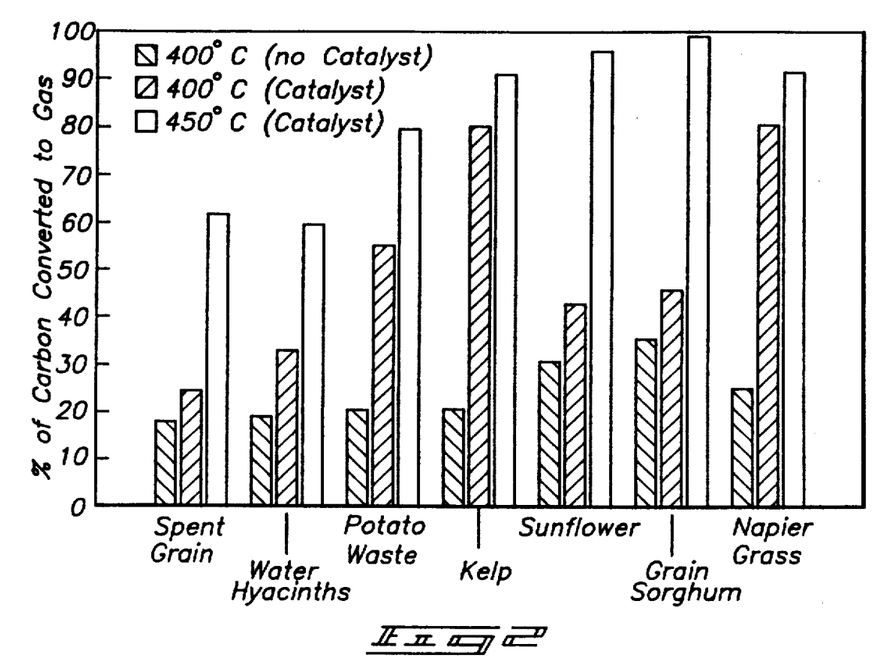
FIG. 2 is a graph showing the effect of a catalyst and temperature on the percentage of carbon converted to gas for various lignocellulosic feedstocks.
Figure 3:
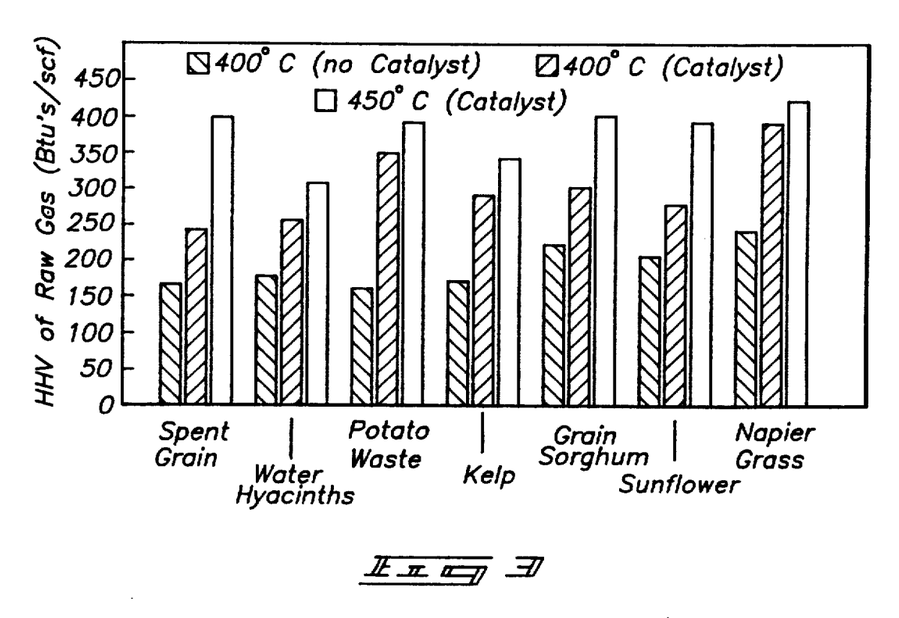
FIG. 3 is a graph showing the effect of the catalyst and temperature on the heating value of the product gas for various lignocellulosic feedstocks.

FIGS. 2 and 3 show the results of tests run on various feedstocks at these varying temperatures and catalyst concentrations. As can be clearly seen from the FIG. 2, the percentage of carbon converted to gas at a reaction temperature of 400° C. was increased when an alkali catalyst and reduced nickel catalyst combination was used. Increasing the reaction temperature to 450° C., along with the use of the catalyst, further increased the conversion percentage. As shown in FIG. 3, the heating value of the raw gas was also increased by using the catalyst and increasing the reaction temperature to 450° C.

Figures 4, 5:
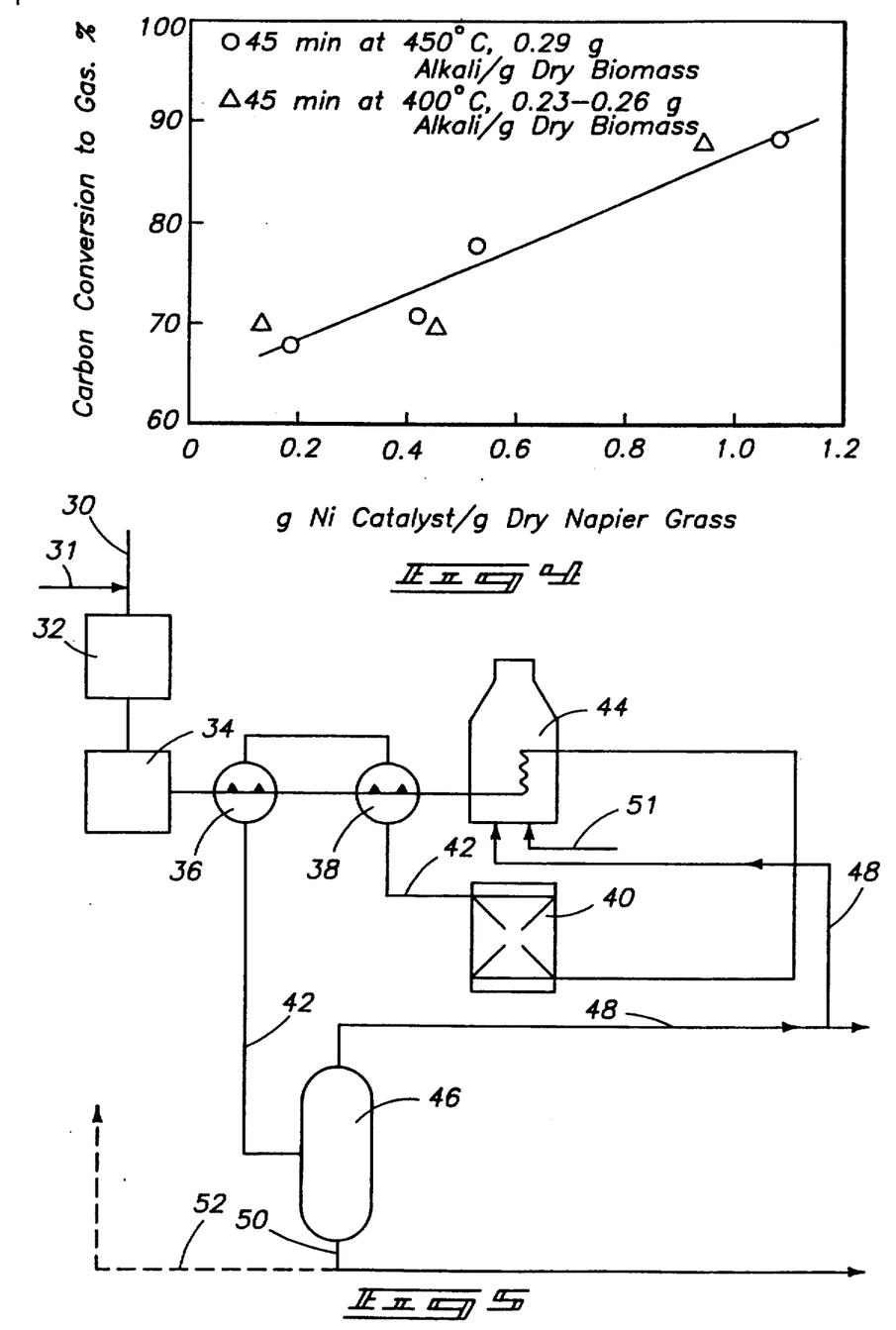
FIG. 4 is a graph showing the effect of nickel catalyst loading on carbon conversion to gas at various temperatures in the present invention.
FIG. 5 is a schematic view of a process for the conversion of lignocellulosic materials into gas in accordance with the present invention.

FIG. 4 shows the effect of reduced nickel catalyst loading on carbon conversion to gas at various temperatures in the present invention. A strong relationship exists between the level of reduced nickel catalyst loading and the carbon conversion. Below a certain threshold value, increasing the catalyst loading also has the effect of raising the methane content of the raw product gas. These two effects work together to produce a significant overall increase in methane production by lowering the reaction temperature and increasing the reduced nickel catalyst loading. This increase is due in part to the increase in the equilibrium methane concentration at lower temperatures. It has been determined that the amount of reduced nickel required for the conversion of the lignocellulosic materials is at least about 0.05 grams of reduced nickel per gram of dry lignocellulosic materials in the reactor.

It has been determined that the alkali catalyst used in the conversion reaction can be selected from the group consisting of sodium, potassium and cesium. Although the exact reaction mechanism is unknown, it is believed that the alkali catalyzes a reduction in the binding effect of lignin so that the reduced nickel may catalyze the conversion of intermediate materials produced to gas. It has been found that some lignocellulosic feedstocks inherently contain the necessary amount of alkali catalyst so that additional amounts are not required to be added to the reactor. A target feedstock can be analyzed for alkali content so that the needed amount of make-up alkali catalyst (if any) can be predicted.

A series of experiments were performed at various levels of alkali carbonate concentration while holding the nickel concentration and the temperature constant. The results of these experiments tend to indicate an inverse relationship between methane concentration in the raw gas and the alkali carbonate concentration. It has also been determined that the amount of alkali catalyst required for the reaction is at least about 0.0001 mole of elemental alkali metal/g of dry lignocellulosic materials in the reactor, although the amount of alkali catalyst depends in part on the type of reactor, the residence time, flow rates, etc. The alkali catalyst may be provided in the form of an oxide, salt, etc.

Preferred Method for Larger Scale Conversion

FIG. 5 shows an apparatus for a preferred embodiment of the process of the present invention. Inlet stream 30 includes lignocellulosic materials and is 2–30 wt % dry solids, preferably 10–20 wt %, which is approximately equal to 1–15 wt % carbon. The lignocellulosic materials in the feedstock are mixed with any required water via stream 31 to form a slurry with a water content of at least 50% by weight, and preferably 80% to 90% by weight. The lignocellulosic materials are passed through size reduction equipment 32 which reduces the size of the lignocellulosic materials to pieces preferably no larger than 1 cm. Any suitable size reduction equipment can be used, such as conventional shredders, grinders, etc.

After the size of the lignocellulosic materials in the inlet stream have been reduced as necessary, the slurry is pumped to 100–300 atm by high pressure pump 34. The stream is next passed through heat exchangers 36 and 38 to preheat the slurry to 300° C. to 400° C. The heat exchangers 36 and 38 are configured to receive effluent stream 42 from reactor 40 in countercurrent flow. It is believed that most of the preheating can be provided by heat exchange with the reactor effluent 42. Necessary auxiliary heat may be supplied by an outside heat source or by burning a portion of the product gas in fired-tube auxiliary heater 44. Using the apparatus shown in FIG. 5 and assuming 80% total heat recovery in the effluent heat exchangers 36 and 38, the breakeven point where the heating value of the product gas produced is equal to the heat required in the auxiliary heater 44 is about 2–3 wt % dry solids (lignocellulosic material). This breakeven points corresponds to a COD of about 25,000 mg/l. TABLE V shows the COD and other properties of a variety of other potential biomass feedstocks which could be converted using the apparatus of the present invention. The feedstocks could be processed individually or in mixtures with other lignocellulosic feedstocks in order to obtain the preferred 10–20 weight percent dry solids.

TABLE V

Properties of Potential Feedstocks for the Low Temperature Gasification Process.

| | pH | COD mg/l | Total Solids mg/l |
| --- | --- | --- | --- |
| Food Processing Wastes | | | |
| Apple juice slurry | 3.7 | 149,000 | — |
| Tomato cannery solid waste | — | 125,000 | 122,000 |
| Olive oil extraction waste | 5.0 | 76,000 | 53,000 |
| Potato peeling waste | — | 54,000 | 51,000 |
| Palm oil extraction waste | 3–6 | 52,000 | 44,000 |

TABLE V-continued
Properties of Potential Feedstocks for the Low Temperature Gasification Process.

|  | pH | COD mg/l | Total Solids mg/l |
|---|---|---|---|
| Pear peeling waste | — | 50,000 | 42,000 |
| Bean blanching waste | — | 20,000 | 21,000 |
| Food Processing Wastewaters | | | |
| Potato processing water | 5.2 | 11,460 | 11,740 |
| Tomato cannery water | 12.1 | 6,420 | — |
| Raisin wastewater | — | 6,000 | 4,400 |
| Distillery and Fermentation Wastes | | | |
| Brewers spent grain | — | — | 195,000 |
| Grape pomace | — | — | 183,000 |
| Molasses residue (slops) | 3–5 | 82,000 | 75,000 |
| Rum stillage waste | — | 76,000 | 58,000 |
| Beet sugar mill effluent | 4–7 | 13,700 | — |
| Brewery wastewater | 8.4 | 1,400 | 700 |
| Industrial Chemical Wastes | | | |
| Wood treating wastewater | 3–6 | 2,000 384,000 | — |

1. For biomass/carbohydrates multiply COD by 0.8 to get approximate loading in mg/l
2. For hydrocarbons multiply COD by 0.35 to get approximate loading in mg/l
3. Divide mg/l by 10,000 to get wt %

After being pressurized and preheated, the lignocellulosic slurry which has been contacted with or contains the appropriate amount of alkali catalyst is delivered to a pressure reactor 40 for conversion of the lignocellulosic materials into a product gas. It is believed that for best results, the reduced nickel catalyst is precharged to the reactor 40 and supported within the reactor, such as on a suitable grate apparatus. Although the reduced nickel catalyst may be purchased in reduced and stabilized form, the pressure reactor 40 could initially be charged with an unreduced nickel catalyst, provided that the catalyst is reduced within the reactor 40. To reduce nickel oxide catalysts to nickel metal, they can be treated with flowing hydrogen at temperatures from ambient to 450° C. The catalyst should be reduced until no additional water is formed. Reduction rate is increased by increasing the temperature, but care must be taken not to overheat and sinter the catalyst. Because the reduction is exothermic, it should begin at relatively low temperature (usually about 100° C.). The temperature should be increased gradually until the reduction is complete.

After effluent stream 42 from the reactor 40 is passed through heat exchangers 36 and 38 to preheat the incoming stream and cool effluent stream 42, the effluent stream 42 is separated into its constituent parts, as in separator 46 or other conventional gas recovery methods. The effluent stream comprises primarily of methane, hydrogen, carbon dioxide and other trace contaminants. Although only one gas separator 46 has been shown, additional units may be utilized as necessary. A product gas stream 48, which contains primarily methane, is removed and may be delivered to the auxiliary heater 44 as necessary for preheating the inlet stream, or retained in a suitable storage facility (not shown) as a fuel gas. Product gas stream 48 would typically contain from 8.3 to 10 scf/lb. solids and from 45 to 53 volume percent methane. Its estimated heating value would be from 450 and 580 btu/scf, and would be at a pressure in excess of 1,000 psia. Combustion air could be provided to auxiliary heater 44 through an air inlet 51.

If desired, outlet effluent stream 50 from the gas separator 46, which may contain organic compounds, may be recycled to the process via a stream 52 for further processing. The composition of this outlet stream is typically less than 1 wt % dissolved organics, which is less than 0.5 wt % carbon.

In a continuous system where the product gas may be removed or vented as it is produced, the pressure in the system can be reduced. To minimize the process energy requirements, the pressure must be high enough to minimize the amount of water converted into steam. Based upon the enthalpy and specific volume of water at various operating conditions, it is believed that the optimum operation conditions are 350° C. to 400° C. and a pressure of at least 100 atmospheres.

Although preferred embodiments of the present invention have been shown, it is obvious that many modifications and variations of the invention are possible in light of the above teachings. For example, a variety of batch or continuous reactors could be used, including fixed bed reactors, fluidized bed reactors and the like. For convenience, it is preferred to use a supported catalyst retained within a continuous reactor. It is therefore to be understood that the present invention may be practiced otherwise than as specifically described.

What is claimed is:

1. A method for converting lignocellulosic materials into a fuel gas, the method comprising:
   maintaining, in a pressure reactor, at a temperature of 300° C. to 450° C. and a pressure of at least 100 atmospheres, lignocellulosic material and water in the presence of amounts of an alkali and of reduced nickel sufficient to catalyze a reaction of the lignocellulosic materials to produce a product gas composed primarily of methane, carbon dioxide and hydrogen.

2. The method of claim 1 wherein at least a portion of the water is contained in the lignocellulosic materials.

3. The method of claim 1 wherein the lignocellulosic material is fed continuously to the pressure reactor.

4. The method of claim 1 wherein the lignocellulosic material is fed to the reactor in an aqueous slurry.

5. The method of claim 1 wherein the reduced nickel is supported on a carrier.

6. The method of claim 1 wherein the reduced nickel is delivered to the pressure reactor in a reduced and stabilized form.

7. The method of claim 6 wherein the reduced nickel is stabilized using carbon dioxide.

8. The method of claim 1 wherein the nickel is reduced within the pressure reactor.

9. The method of claim 1 wherein the alkali is selected from the group consisting of sodium, potassium and cesium.

10. The method of claim 1 wherein the amount of reduced nickel used to catalyze the reaction is at least about 0.05 grams of reduced nickel per gram of dry lignocellulosic material in the reactor.

11. The method of claim 1 wherein the amount of alkali used in the reaction is at least about 0.0001 mole of elemental alkali per gram of dry lignocellulosic material in the reactor.

12. The method of claim 1 further comprising the step of:
   pretreating the lignocellulosic materials to homogenize the materials.

13. The method of claim 12 wherein the pretreating step comprises decreasing the size of the lignocellulosic material to an average size no greater than about 1.0 centimeters.

14. The method of claim 1 further comprising the step of:

pressurizing the lignocellulosic material to the reaction pressure before delivery to the pressure reactor.

15. The method of claim 1 further comprising the step of:

preheating the lignocellulosic material before delivery to the pressure reactor.

16. The method of claim 1 wherein at least a portion of the amount of the alkali catalyst is provided by the lignocellulosic material being converted.

17. A method for converting lignocellulosic material into a fuel gas, the method comprising:

pretreating lignocellulosic material to reduce the size and homogenize the material;

adding water to the lignocellulosic material such that the water content of the resulting mixture is at least about 50 percent by weight;

pressurizing the lignocellulosic material and water to a desired reaction pressure;

preheating the lignocellulosic material and water to a desired reaction temperature;

delivering the lignocellulosic material and water to a pressure reactor; and maintaining, in the pressure reactor at a temperature of 300° C. to 450° C. and a pressure of at least 100 atmospheres, the lignocellulosic material and water, in the presence of amounts of an alkali and of reduced nickel sufficient to catalyze a reaction of the lignocellulosic material to produce a product gas composed primarily of methane, hydrogen and carbon dioxide.

18. The method of claim 17 wherein water content of the mixture is about 80 to 90 percent by weight.

* * * * *